United States Patent Office 3,536,762
Patented Oct. 27, 1970

3,536,762
TRISUBSTITUTED 4 - HYDROXYCYCLOPENTANE-1,3-DIONES AND THE PROCESS FOR THE PRODUCTION THEREOF
Phillip Roy Ashurst, Burgess Hill, and Derek Roy James Laws, Bexleyheath, England, assignors to Brewing Patents Limited, London, England, a British company
No Drawing. Filed Nov. 17, 1966, Ser. No. 595,017
Claims priority, application Great Britain, Nov. 29, 1965, 50,635/65
Int. Cl. C07c *49/28, 49/40*
U.S. Cl. 260—586     5 Claims

ABSTRACT OF THE DISCLOSURE

Trisubstituted 4-hydroxycyclopentane-1,3-diones of the type of 2-(3-methylbutyryl)-4-hydroxy-4-(4-methylpent-1-yn-3-enyl)-5-(3-methylbut-2-enyl)-cyclopentane - 1,3-dione; 4-hydroxy-5-(3-methylbut-2-enyl)-2-(2 - methylpropionyl)-4-(4-methylpent-1-yn-3-enyl) - cyclopentane-1,3-dione; 4-hydroxy-5-(3-methylbut-2-enyl)-2-(2-methylbutyryl)-4-(4-methylpent-1-yn-3-enyl) - cyclopentane-1,3-dione; etc., (see also Formula III infra), which are convertible into isohumelone type compounds useful in the bittering of beer, are synthesized by alkylating or alkenylating the corresponding 5-unsubstituted 4-hydroxycyclopentane-1,3-diones with an alkylating or alkenylating agent having not more than six C atoms in the alkyl or alkenyl group(s) thereof or by a procedure involving cyclizing the corresponding β-keto ester already containing the eventual 5-substituent. The compounds III can be converted into corresponding isohumulone type compounds by treatment with a suspension of mercuric salt under acid conditions. Preparation of compounds III and of the β-keto esters are disclosed.

---

This invention relates to the synthesis of trisubstituted 4-hydroxycyclopentan-1,3-diones and to the conversion of such substances into substances useful for the bittering of beer.

The bitter flavour of beer brewed by conventional processes is due to the presence of substances derived from the resinous portion of cones from the hop-plant. Among other constitutents, the resins of hops contain humulone, cohumulone and adhumulone, collectively known as α-acids, and having essentially the same chemical structure (I) in which the individual α-acids are distinguished by having different alkyl groups R′.

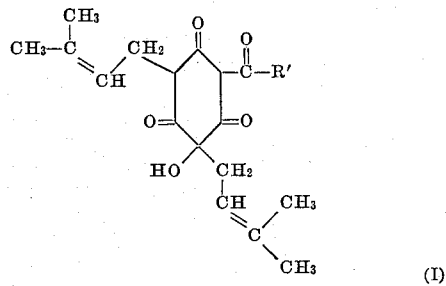

(I)

In the brewing of beer, the boiling of wort with hops leads to the extraction of the α-acids and transforms them into the related compounds (II) of which the chief structural feature is a five-membered cyclic nucleus in place of the six-membered ring nucleus present in the parent compounds.

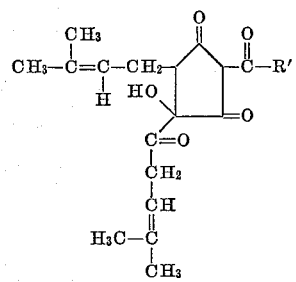

Each α-acid yields at least four isomers which differ in the intensity of their bitterness, so that the bitterness of the product varies according to the proportions in which the individual isomers are present.

Moreover, the bittering of beer with hops is an inefficient process because of the inadequacy of wort as an extraction medium for the α-acids and because of the losses of the bitter constituents during the processing of wort and beer. Thus, the amount of bittering substance in beer is usually less than one-third of that potentially introduced with the hops. Furthermore, it is difficult to achieve constancy in bitter flavour using hops because the resins of hops undergo change to varying degrees during storage, for example by oxidation, giving some components which are bitter and others which are not bitter. The bitter components arising in this way differ in solubility and intensity of bitterness from the products of direct transformation of the α-acids.

The transformation of α-acids, often described as the transformation to isohumulones, can be effected by heating them in mild alkaline solutions, for example, in sodium carbonate solution. Improved methods for bittering beer have been proposed based either upon the treatment of hops with mild alkali prior to their addition to boiling wort or upon the extraction of hops with an organic solvent followed by removal of the solvent and treatment of the extract under mildly alkaline conditions. The product in the latter case may be added at the stage when boiling of the wort is carried out, prior to fermentation, or to conditioned beer and considerable improvement in the utilisation of hop-substances is claimed as a result of these methods. However, the transformation from components containing the characteristic six-carbon cyclic nucleus into those having the five-carbon cyclic nucleus gives a mixture of isomeric products and is prone to undesired side-reactions.

Accordingly, it is an object of the present invention to provide appropriately substituted cyclopentan-1,3-diones from which the substances used for the bittering of beer may be obtained, a process for effecting the conversion of such diones into the bittering substances as well as processes for the synthesis of the said cyclopentan-1,3-diones.

The present invention provides trisubstituted 4-hydroxy-cyclopentan-1,3-diones having the general formula

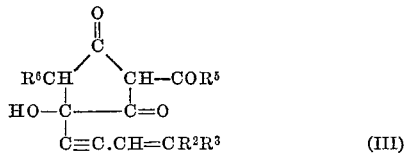

(III)

in which each of $R^2$ and $R^3$ is a hydrogen atom or an alkyl group having one to three carbon atoms, $R^5$ is an alkyl group having not more than four carbon atoms and $R^6$ is an alkyl or alkenyl group having not more than six carbon atoms.

The substituents $R^2$ and $R^3$ may be like or unlike in character. Either or both may be methyl, ethyl, n-propyl or isopropyl groups. The substituent $R^5$ may be a straight or branched chain alkyl group but is preferably the latter e.g. an isopropyl or secondary-butyl group. The substituent $R^6$ may be a straight or branched chain alkyl or alkenyl group having up to six carbon atoms e.g. an ethyl, n-butyl, n-hexyl, isopropyl, isobutyl, propenyl, isobutenyl or isopentenyl group.

Several routes have been found to be available for the synthesis of the above compounds. In one such route the compounds having the general Formula III are obtained by alkylating or alkenylating a 4-hydroxy-cyclopentan-1,3-dione having the general formula

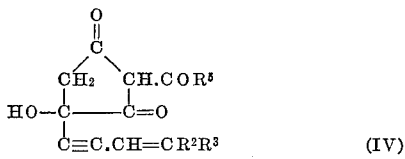

(IV)

in which $R^2$, $R^3$ and $R^5$ are as above defined, with an alkylating or alkenylating agent having not more than six carbon atoms in the alkyl or alkenyl group or groups present therein. The entering substituent appears in the 5-position in the cyclopentan-1,3-dione ring. The preferred alkenylating agents are esters of 3-methyl-but-2-en-1-ol. The ester may be one with hydrogen chloride, hydrogen bromide, sulphuric acid or a phosphoric acid such as an O,O-diarylphosphoric acid, e.g. an O-alkyl-O,O-diaryl or an O-alkenyl-O,O-diaryl phosphate. Specific examples of such alkylating and alkenylating agents include n-butyl bromide, isohexylbromide, 1-bromo-3-methyl-but-2-ene, O-isobutyl-O,O-diphenyl phosphate, O(3,3-dimethylallyl)-O,O-diphenylphosphate and dimethylsulphate.

The 4-hydroxy-cyclopentan-1,3-dione having the general Formula IV may be obtained by hydrolysis of the corresponding 4-acyloxy compound. Such hydrolysis may be effected by treatment with a solution of an alkali metal hydroxide in an alkanol having one to four carbon atoms, e.g. methanol at any temperature from room temperature to the reflux temperature of the reaction mixture.

Both the 4-hydroxy-cyclopentan-1,3-diones having the general Formula IV and the corresponding 4-acyloxy compounds are obtainable by the ring closure of a β-keto-ester having the general formula

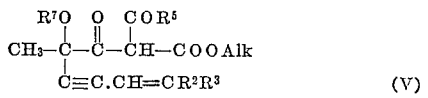

(V)

in which $R^2$, $R^3$ and $R^5$ are as above defined, $R^7$ is a hydrogen atom or a carboxylic acyl group and Alk is an alkyl group having one to four carbon atoms, by heating in the presence of an alkali metal alkoxide preferably in an inert diluent such as a normally liquid aromatic hydrocarbon or a mixture thereof.

The above β-keto-esters are obtainable by a condensation between a β-keto ester having the general formula

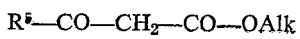

$R^5$—CO—CH$_2$—CO—OAlk (VI)

in which $R^5$ and Alk are as above defined, with a substituted lactic acid halide having the general formula

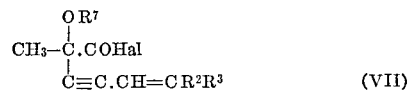

(VII)

in which $R^2$, $R^3$ and $R^7$ are as above defined and Hal is a chlorine or bromine atom, in the presence of magnesium metal or of a magnesium alkoxide. The latter may be prepared by the action of metallic magnesium upon an alkanol, preferably having not more than four carbon atoms. The reaction is conveniently carried out by refluxing in a dry aromatic hydrocarbon solvent.

The substituted lactic acid halides (VII) may be readily obtained by treating the corresponding substituted lactic acid with the halide of an acid the undesired reaction products of which are readily volatilised. The preferred acid halide for use in this way is oxalyl chloride but other acid chlorides such as thionyl chloride may also be used. It is somewhat surprising that when the substituent $R^7$ is an hydroxyl group that the reaction can be brought about. However, the hydroxyl moiety of the carboxyl group is more readily attacked than an hydroxyl substituent on the α-carbon atom and whilst some reaction may take place at the latter position a satisfactory yield of the desired acid chloride can nevertheless be obtained especially when using oxalyl chloride. When $R^7$ is a carboxylic acyl group the hydroxyl group is protected against any possibility of attack but, as will be appreciated, this carboxylic acyl group has subsequently to be hydrolysed.

The substituted lactic acids discussed above may be obtained by the reaction of pyruvic acid or of an alkyl pyruvate having up to four carbon atoms in the alkyl group with an alkali metal or Grignard derivative of a hydrocarbon, which hydrocarbon has the general formula $$R^2R^3C=CH—C\equiv CH \qquad (VIII)$$

in which $R^2$ and $R^3$ are as above defined. The hydrogen atom attached to the terminal acetylenic carbon atom can be replaced by an alkali metal by treating the hydrocarbon with an alkali metal amide in anhydrous ammonia or by a Grignard grouping by reacting the hydrocarbon with an alkyl magnesium halide in solution in an anhydrous dialkyl or cyclic ether such as diethyl ether or tetrahydrofuran. The reaction product is then hydrolysed in a manner known per se to give the substituted lactic acid in which $R^7$ is a hydrogen atom. When it is desired that $R^7$ be a carboxylic acyl group the free acid is then treated with an acylating agent such as a carboxylic acid anhydride e.g. acetic anhydride, in known manner.

The hydrocarbons having the general Formula VIII are readily obtainable by removal of a hydrogen atom and rearrangement of the corresponding allenes having the general formula

$$R^2R^3CH—CH=C=CH(Hal) \qquad (IX)$$

in which $R^2$ and $R^3$ are as above defined and Hal is a chlorine or bromine atom. This reaction may be readily brought about by heating the substituted allene with anhydrous cuprous cyanide. Hydrogen cyanide is evolved and the cuprous halide corresponding to the halogen present in the allene concomitantly formed. On account of their higher boiling points it is preferred to use the bromoallenes in this reaction. Hydrogen cyanide can be removed from the product by washing the organic phase with water. Allenes which may be used include 1-bromo-3-methylallene, 1-bromo-3-isopropylallene, 1-chloro-3-isopropylallene and 1-chloro-3-secondary butylallene.

In a modification of the last two stages of the above process instead of using an allene there is used as starting material a monohalogenated acetylenic hydrocarbon having the general formula

$$R^2R^3CH—CH(Hal)—C≡CH \quad (X)$$

in which $R^2$, $R^3$ and Hal are as above defined. Such hydrocarbon is treated with at least two moles of an alkali metal amide dissolved in an anhydrous solvent therefor such as liquid ammonia. Hydrogen halide is eliminated between the γ- and δ-carbon atoms and the hydrogen atom attached to the terminal acetylenic carbon atom is replaced by an alkali metal atom. The resulting reaction mixture can then be reacted with pyruvic acid or the alkyl pyruvate. The halogenated allenic hydrocarbons having the general Formula IX may be obtained by the methods described in Tetrahedron Letters, 1963, page 483 and under Patel, Whiter and Greaves, J. Chem. Soc. C. 1966, page 1223.

In the procedure described above the 4-hydroxycyclopentan-1,3-dione ring is first formed and the substituent $R^6$ then introduced in the 5-position. In a modified procedure the substituent $R^6$ may be present in the corresponding β-keto ester prior to cyclisation. This has been accomplished in two different ways. Thus a tri-substituted 4-acyloxycyclopentan-1,3-dione having the general formula

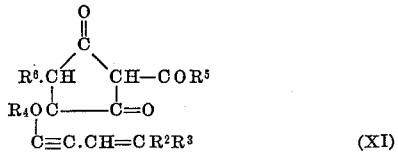

$$\quad (XI)$$

in which $R^2$, $R^3$, $R^5$ and $R^6$ are as previously defined and $R^4$ is a carboxylic acyl group, hydrolysed to a free hydroxyl group in an entirely similar manner to the analogous compounds not containing the substituent $R^6$. Alternatively the corresponding compound containing a free hydroxyl group may be directly synthesised. These two kinds of compound are respectively obtained by the ring closure of the corresponding β-keto esters having the general formula

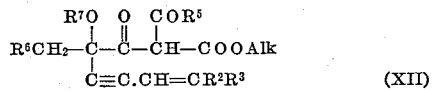

$$\quad (XII)$$

in which $R^2$, $R^3$, $R^5$, $R^6$, $R^7$ and Alk are all as previously defined, by heating in an alkali metal alkoxide and preferably dissolved in an inert diluent. In carrying out such reactions, as well as the analogous reactions previously described, the product of ring closure and unchanged starting material can be conveniently separated by column chromatography using a column packed with silicic acid.

The above β-keto esters (XII) may, in turn, be obtained by the condensation of a β-keto ester having the Formula VI with a substituted lactic acid halide having the general formula

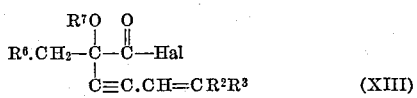

$$\quad (XIII)$$

in which $R^2$, $R^3$, $R^6$, $R^7$ and Hal are all as previously defined, in the presence of magnesium metal or of a magnesium alkoxide. This reaction is conveniently carried out by refluxing in a dry aromatic hydrocarbon solvent.

The substituted lactic acid halides having the Formula XIII may be obtained from the correspondingly substituted lactic acids using the halide of an acid the undesired reaction products of which are readily volatilised. This procedure is entirely analogous to that discussed with reference to the formation of the halides VII and when it is desired that $R^7$ be an acyl group treatment with an acylating agent such as a carboxylic acid anhydride should be carried out prior to treatment with the said halide.

The lactic acids corresponding to the halides having the Formula XIII are obtained by reacting a substituted pyruvic acid or alkyl pyruvate having the general formula $$R^6CH_2 \cdot CO \cdot COOR^8$$

in which $R^6$ is as above defined and $R^8$ is a hydrogen atom or an alkyl group having one to four carbon atoms with the alkali metal or Grignard derivative of a hydrocarbon having the general Formula VIII. The reaction is performed in an entirely analogous manner to the corresponding reaction with pyruvic acid or an alkyl pyruvate outlined above. Moreover the modified procedure employing as starting material a monohalogenated acetylenic hydrocarbon having the general Formula X may also be similarly used in this case.

In accordance with an important feature of the invention the 4-hydroxycyclopentan-1,3-diones having the general Formula III are converted into isohumulone type compounds having the general formula

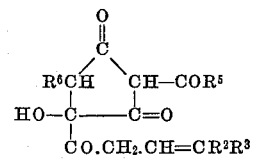

in which $R^2$, $R^3$, $R^5$ and $R^6$ are as previously defined, by treatment with a suspension of a mercuric salt under acid conditions. The mercuric salt may be suspended in an aqueous alcoholic medium such as a mixture of water and methanol and/or ethanol. It is preferred that the acid present and the mercuric salt have a common anion, a convenient choice being sulphuric acid and mercuric sulphate. The reaction may be carried out at room temperature or raised temperature e.g. at 70–100° C. The products obtained have been found to be mixtures of the starting material (III) and the corresponding isohumulone type compounds (XIV) which mixtures can be separated employing a chromatographic column packed with silicic acid. When in Formula XIV $R^2$ and $R^3$ are both methyl groups, $R^5$ is an isobutyl group and $R^3$ is a 3-methylbut-2-enyl group the compound obtained is isohumulone itself and this has been demonstrated to be identical with an authentic specimen thereof. By varying one or more of the groups $R^2$, $R^3$, $R^5$ and $R^6$ other substances of similar type are produced.

The following examples illustrate the invention.

EXAMPLE 1

A mixture of 1-bromo-4-methylpenta-1,2-diene (20.1 g., 0.125 mole) and dry cuprous cyanide (11.2 g., 0.125 mole) was heated under gentle reflux and the material passing over up to 80° C. collected. The distillate was diluted with diethyl ether (50 ml.), washed with water to remove hydrocyanic acid, dried, and redistilled giving 2-methylpent-2-en-4-yne, boiling point 79–80° C./760 mm.

The ultra-violet spectrum of this compound is ethanol gave $\lambda_{max}$ 220 mμ and $\epsilon_{max}$ 10,050 which values are characteristic of the —C=C—C≡C— grouping. The infra-red spectrum includes bands at $\nu_{max}$ 3310 vs. 2100 s. and 1630 s. cm.$^{-1}$ which are respectively characteristic of the —C≡C—H, —C≡C— and >C=C< groupings.

Magnesium (2.4 g.) was suspended in dry tetrahydrofuran (25 ml.), activated with a crystal of iodine, and treated with 1-bromopropane (12.3 g.) dissolved in dry tetrahydrofuran (25 ml.). When the reaction moderated following completion of the addition of the bromopropane, the mixture was cooled to 5° C. and 2-methylpent-2-en-4-yne (10 g.) in dry diethyl ether (20 ml.) was added thereto. The mixture was allowed to reach room temperature during which time propane was evolved and was then refluxed for four hours. Ethyl pyruvate (11.3 g.) dissolved in dry tetrahydrofuran (50 ml.), was added to the mixture which had previously been cooled to 5° C.: The reaction was again refluxed for four hours, cooled to 5° C., and a solution of ammonium chloride (6.0 g.) in water (25 ml.) added. After standing at room temperature for two to three hours the reaction mixture was extracted with diethyl ether, the ether solution dried and evaporated to give, as residue, the substituted lactic ester, ethyl 2,6-dimethyl - 2 - hydroxyhept - 3 - yn-5-enoate, boiling point 85–90° C./ $2 \times 10^{-2}$ mm.

The infra-red spectrum includes bands at $\nu_{max}$ 3450 s., 2220 m. and 1720 v.s. cm.$^{-1}$ which are respectively characteristic of the —O—H, —C≡C— and >C=O groupings.

The substituted ester of lactic acid (obtained as described above) (8 g.) dissolved in methanol (50 ml.) containing potassium hydroxide (7.5 g.) was allowed to stand for 72 hours at room temperature. After the addition of water (100 ml.), carbon dioxide gas was passed into the solution until the pH reached 8.0. Evaporation of the solvent at 30° C. gave a residue which was suspended in 2 N hydrochloric acid (50 ml.). Extraction with diethyl ether gave a solution which was re-extracted with saturated aqueous sodium hydrogen carbonate solution. On acidification of the re-extract and extraction with diethyl ether, followed by drying and evaporation of the solvent there was obtained 2,6-dimethyl -2 - hydroxyhept-3-yn-5-enoic acid, boiling point 85–90° C./8×10$^{-3}$ mm.

The infra-red spectrum includes bands at $\nu_{max}$ 3450 s, 2210 m. and 1720 s. cm.$^{-1}$ which are respectively characteristic of the —O—H, —C≡C— and >C=O groupings.

The acid obtained as described above (1.63 g.) dissolved in dry benzene (20 ml.) was treated at 7° C. with oxalyl chloride (1.06 g.) in dry benzene (5 ml.), the solution being allowed to come up to room temperature gradually and was then stored for 18 hours. Volatile materials were removed by evaporation of the reaction mixture under reduced pressure at 30° C., and the residue was then added to a solution of ethyl isovaleryl acetate (1.72 g.) dissolved in dry benzene (50 ml.) in which was suspended magnesium turnings (1.2 g.). The resulting solution was heated to reflux temperature for a period of 4–5 hours, then cooled, filtered, and the benzene removed under reduced pressure at 30° C. Distillation under reduced pressure of the residue to remove low boiling material gave 8-carbethoxy - 6 - hydroxy - 2,6,11 - trimethyl-dodeca-2-en-4-yn-7,9-dione as the residue. Potassium-tertiary-butoxide (1.5 g.) was added to a solution of the thus obtained dione in a mixture of dry toluene (20 ml.) and tertiary butanol (10 ml.). The mixture was heated to reflux for 24 hours, cooled and diluted with diethyl ether. The resulting mixture was acidified, the organic phase separated and dried. On removal of the solvent there was obtained a mixture of 2-(3-methylbutyryl)-4-hydroxy - 4 - (4 - methylpent-1-yn-3-enyl)-cyclopentane-1,3-dione and unchanged starting material. Separation of the two materials was achieved by column chromatography on silicic acid using a mixture of ethyl acetate and hexane (1:5 by volume) as eluent.

The ultra-violet spectrum of this compound in acidic ethanol gave $\lambda_{max}$ 263 m$\mu$, $\epsilon_{max}$ 20,843 and in alkaline ethanol $\lambda_{max}$ 271 m$\mu$ and $\epsilon_{max}$ 23,880 which values are together characteristic of the cyclic dione structure. The infrared spectrum included bands at $\nu_{max}$ 3450 s. 2260 w., 1740 v.s. and 1650 m. cm$^{-1}$ which are respectively characteristic of the —O—H, —C≡C—, >C=O and

>C=C< groupings.

The resulting dione (250 mg.) was dissolved in dry diethyl ether (10 ml.) containing sodium ethoxide (140 mg.) in dry methanol (2 ml.) and after the addition of 1-bromo-3-methylbut-2-ene (150 mg.) stirred for 2 hours at 5° C. and then for 18 hours at 20° C. The mixture was diluted with water, acidified with dilute hydrochloric acid, the ethereal layer separated and dried over anhydrous magnesium sulphate and the ether evaporated. There was obtained as residue an oil which contained 2-(3-methylbutyryl) - 4 - hydroxy - 4 - (4-methylpent-1-yn-3-enyl) - 5 - (3-methylbut - 2 - enyl)cyclopentan-1,3-dione together with unchanged starting material. This was separated by column chromatgraphy on silicic acid using a mixture of ethyl acetate and hexane (5:95 volume) as eluent.

The ultra-violet spectrum of this compound includes the characteristic features to be expected in an isoprenylated cyclopentane dione. The infra-red spectrum includes bands at $\nu_{max}$ 3450, 2260, 1720 and 1600 (doublet) cm.$^{-1}$ which are respectively characteristic of the —O—H, —C≡C—, >C=O and >C=C< groupings.

The cyclopentane-1,3-dione obtained as described above (200 mg.) was dissolved in methanol (10 ml.) and added to a stirred suspension of mercuric sulphate (200 mg.) in methanol (10 ml.) and 2 N sulphuric acid (10 ml.). After stirring for 8 hours the suspension was filtered, diluted with diethyl ether and the ethereal solution washed with water. Evaporation of the ether afforded a pale yellow oil (170 mg.) from which isohumulone was separated by column chromatography on silicic acid using a mixture of ethyl acetate and hexane (15:85 by volume) as eluent.

The ultra-violet and infra-red spectra of the purified isohumulone were identical with those of an authentic specimen and gave humulinic acid together with isohex-3-enoic acid on alkaline hydrolysis.

EXAMPLE 2

Alternative procedure for preparing the substituted lactic ester.

Sodamide was prepared by adding sodium (7.0 g., 0.3 mol) to liquid ammonia (1 litre) and the mixture stirred for 3 hours. 3 - bromo-4-methylpent-1-yne (23 g., 0.14 mole) was then added, the mixture stirred for a further 4 hours, and then ethyl pyruvate (11.6 g., 0.1 mole) in ether (20 ml.) was added. After stirring overnight the sodium salt was decomposed by the addition of ammonium chloride (26.7 g., 0.5 mole) and the ammonia allowed to evaporate. The residue was extracted with ether (3× 200 ml.), the combined extract washed with dilute hydrochloric acid (200 ml.) and dried. Evaporation of the solvent gave ethyl 2,6-dimethyl-2-hydroxyhept-3-yn-5-enoate.

The remainder of the process was carried out as described in Example 1.

EXAMPLE 3

The acid chloride of 2,6-dimethyl-2-hydroxyhept-3-yn-5-enoic acid was prepared as described in Example 1.

Ethyl 2-oxo-4-methylpentanoate was prepared by the following procedure:

Ethyl tertiary butyl malonate (18.8 g.) was added with stirring to a mixture of magnesium ethoxide (11.4 g.) and dry diethyl ether (70 ml.). The mixture was refluxed for 1 hour when most of the magnesium ethoxide had dissolved to form a cloudy solution. Isobutyryl chloride (12 g.) in diethyl ether (30 ml.) was added dropwise to the stirred solution. After the addition the mixture was refluxed for 2 hours, cooled, acidified with dilute sulphuric acid and extracted with diethyl ether. The ethereal extract was washed with water, dried over anhydrous magnesium sulphate and the solvent removed leaving crude ethyl tertiary-butyl isobutyryl acetate. The crude ester was dissolved in dry benzene (100 ml.) and paratoluene sulphonic acid (1 g.) was added and the mixture refluxed for 6 hours. The mixture was then cooled, washed with sodium bicarbonate solution, dried over anhydrous magnesium sulphate and, after removing the solvent, distilled under reduced pressure, giving ethyl isobutyryl acetate B.P. 98–104° C./20 mm. (yield 9.8 gm.).

A solution of 1.70 grams of ethyl 2-oxo-4-methyl-pentanoate in 5 ml. of dry benzene was added to a suspension of 0.35 gram of magnesium ethoxide (prepared by the method of Meerwein and Schmidt, Liebig's Annalen, volume 444, page 236, (1925)) in 50 ml. of dry benzene. The mixture was refluxed for 30 minutes, cooled to room temperature, treated with 1.6 grams of ethyl 2-oxo-4-methylpentanoate dissolved in 5 ml. of benzene, and held thereat for 18 hours. The reaction mixture was then acidified with hydrochloric acid, diluted with diethyl ether, the ethereal layer washed with water, the ether layer dried over anhydrous magnesium sulphate and the ether evaporated to give a brown oil. A sample of the oil was chromatographed upon a column of silica gel (25 grams) and eluted with hexane. This effected separation between unchanged starting material and 8 - ethoxycarbonyl - 6 - hydroxy - 2,6,11 - trimethylundeca - 2 - en-4-yne-7,9-dione (72 mg.).

A solution of the thus produced dione (70 mg.) in 50 ml. of dry toluene and dry tertiary-butanol was treated with 1 gm. of potassium tertiary-butoxide and the mixture refluxed for 24 hours. The mixture was then cooled, acidified with dilute hydrochloric acid, diethyl ether added, the ethereal extract separated, dried over anhydrous magnesium sulphate, and the ether evaporated to leave as residue a brown oil which was then separated by column chromatography on silicic acid gel using ethyl acetate as eluent. There was thus isolated 60 mg. of an oil which was identified as 4-hydroxy-2-(2-methylpropionyl) - 4-(4 - methylpent-1-yn-3-enyl)-cyclopentane-1,3-dione.

A solution of the thus produced dione (60 mg.) in dry diethyl ether was added to a solution of sodium (0.15 gm.) in dry ethanol (10 ml.). The resulting solution was cooled to 0° C. and a solution of 1-bromo-3-methylbut-2-ene (70 mg.) in 5 ml. of diethyl ether added. The reaction mixture was stirred at room temperature for 18 hours, then diluted with water, acidified with hydrochloric acid and extracted with diethyl ether. The ethereal layer was separated, washed with water and dried over anhydrous magnesium sulphate to yield an oil (75 mg.) which is 4 - hydroxy - 5 - (3 - methylbut - 2 - enyl) - 2 - (2-methylpropionyl) - 4 - (4 - methylpent - 1 - yn - 3-enyl)-cyclopentane-1,3-dione.

To convert the thus obtained 1,3-dione to isocohumulone a stirred solution of 75 mg. of mercuric sulphate in 5 ml. of methanol containing 1 ml. of 50% aqueous sulphuric acid was prepared and to it was added dropwise 75 mg. of the dione dissolved in 5 ml. of methanol. The mixture was warmed to 40° C. and held thereat for 4 hours, then cooled, diluted with water, extracted with diethyl ether, the ethereal layer separated, dried over anhydrous magnesium sulphate and the ether evaporated. The resulting yellow oil (58 mg.) was separated by column chromatography on silica gel plates using a mixture of ethyl acetate and hexane (15:85 by volume) as eluent. Isocohumulone was isolated and shown to be identical with an authentic specimen and to have the ultraviolet spectrum thereof.

EXAMPLE 4

The acid chloride of 2,6-dimethyl-2-hydroxyhept-3-yn-5-enoic acid was prepared as described in Example 1.

Ethyl 2-oxo-3-methylhexanoate (B.P. 103–108° C./20 mm.) was prepared by the procedure described in Example 3 for ethyl 2-oxo-4-methylpentanoate on substituting a stoichiometric proportion of secondary valeryl chloride for isobutyryl chloride.

Following the procedure described in Example 3 ethyl 2-oxo-3-methylhexanoate was treated with magnesium ethoxide and the product treated with 1.72 grams of ethyl 2-oxo-4-methylhexanoate to yield, after chromatography upon silica gel, 8-ethoxycarbonyl-6-hydroxy-2,6,10-trimethyldodeca-2-en-4-yne-7,9-dione (86 mgm.). A solution of this dione in dry toluene and dry tertiary butanol was then cyclised using potassium tertiary-butoxide as the cyclising agent to give 4-hydroxy-2-(2-methylbutyryl)-4-(4 - methylpent-1-yn-3-enyl)-cyclopentane-1,3-dione (65 mgm.). This dione in solution in dry diethyl ether was first treated with sodium ethoxide and then with a solution of 1-bromo-3-methylbut-2-ene in diethyl ether to give 4-hydroxy - 5-(3 - methylbut-2-enyl)-2-(2-methylbutyryl)-4 - (4 - methylpent - 1 - yn - 3 - enyl)-cyclopentan-1,3-dione (63 mgm.).

The thus produced 1,3-dione was converted to isoadhumulone by adding a solution thereof in methanol to a stirred solution of mercuric sulphate in methanol following the procedure of Example 3 and submitting the product to column chromatography on silica gel plates. A fraction was eluted which yielded a product which proved to be identical with an authentic specimen of isoadhumulone and which had the same ultra-violet spectrum.

EXAMPLE 5

Hex-3-en-1-yne was prepared by treating the paratosyl ester of hex-1-yn-4-ol with alkali in the manner described by Eglington and Whiting, J. Chem. Soc. 1950, page 3650, and Petrov, Porfiryeva and Semenov, Zhur, Obschchei. Khim. volume 27, page 1258 (1957).

A stirred suspension of magnesium turnings (2.4 g.) in dry diethyl ether (25 ml.) was treated dropwise with a solution of 1-bromopropane (12.3 g.) in dry diethyl ether (10 ml.) and activated with a crystal of iodine. When the addition was complete the mixture was heated under reflux for 1 hour, cooled to 0° C., and treated with a solution of hex-3-en-yne (10 g.) in dry diethyl ether (10 ml.). The mixture was stirred rapidly and heated to 35° C. for 2 hours, when a vigorous evolution of propane occurred, then cooled to 0° C. and a solution of ethyl pyruvate (11.6 g.) added dropwise in dry diethyl ether (10 ml.). The mixture was allowed to stand at room temperature overnight and then treated with saturated aqueous ammonium chloride (150 ml.). Dilution of the solution with diethyl ether, washing with water, drying with anhydrous magnesium sulphate and evaporating afforded a dark brown oil which on distillation gave ethyl 2-hydroxy-2-methyloct-3-yn-5-enoate as a pale yellow oil; 8.0 g., B.P. 65° C. (bath)/$2 \times 10^{-3}$ mm.; found C, 67.8; H, 8.1. $C_{11}H_{16}O_3$ requires C, 67.5; H, 8.2%. Ultra-violet spectra in neutral ethanol $\lambda_{max}$ 228 m$\mu$, $\epsilon_{max}$ 10,600 which values are characteristic of the —C=C—C≡C— grouping. The infra-red spectrum includes bands at $\nu_{max}$ 2225w and 1650m cm.$^{-1}$ which are respectively characteristic of the C≡C and C=C groupings.

This ester was hydrolysed with methanolic potassium hydroxide and the resulting acid (B.P. 60° C./$2 \times 10^{-3}$ mm.; found, C, 64.0%; H, 6.8%: $C_9H_{12}O_3$ requires C, 64.3%; H, 7.1%), treated with oxalyl chloride in a manner similar to that employed in Example 1 for treatment of the lactic acid ester used therein. A solution of this acid chloride in dry benzene was then reacted with a solution of ethyl isovaleryl acetate in benzene in the presence of magnesium turnings to give 9-ethoxycarbonyl-7-hydroxy-7,12-dimethyldodeca-3-en-5-yne - 8,10 - dione, the procedure being analogous to the corresponding condensation in Example 1. Without purification this dione in solution in a mixture of dry toluene and tertiary butanol was treated with potassium tertiary-butoxide in order to bring about cyclisation. The cyclised product was then separated from unchanged starting material by column chromatography as described in Example 1 and is 4-hydroxy-2(3-methyl-butyryl) - 4-hex-1-yn-3-enyl) - cyclopentane-1,3-dione. This dione was then isoprenylated following the procedure used in Example 1 to give an oil which was shown to contain 2-(3-methylbutyryl)-4-hydroxy-4-(hex-1-yn-3-enyl) - 5-(3-methylbut-2-enyl)-cyclopentan-1,3-dione by chromatographic separation. The latter dione (50 mgm.) dissolved in methanol was then treated with methanolic mercuric sulphate containing sulphuric acid following the procedure described to give, after chromatography, a small quantity of substance isomeric with isohumulone and differing therefrom in the

EXAMPLE 6

2-methylpent-2-en-4-yne was prepared as described in Example 1.

Ferric nitrate crystals (0.5 g.) were added to liquid ammonia (750 ml.) and after stirring for 5 minutes, sodium metal (7 g.) was added during 15 minutes and the mixture stirred for 1 hour. 2-methylpent-2-en-4-yne (25 g.) in dry diethyl ether (50 ml.) was added, the mixture stirred for 1.5 hours and ethyl pyruvate (23.2 g.) in dry diethyl ether (50 ml.) was added dropwise during 30 minutes. The mixture was stirred for 5 hours, the sodium salt slowly decomposed with ammonium chloride (26.5 g.) and the ammonia allowed to evaporate. The residue was twice extracted with diethyl ether (2× 300 ml.), the extracts combined and the combined extract washed with dilute hydrochloric acid and dried using anhydrous magnesium sulphate. Evaporation of the solvent gave ethyl 2-hydroxy-2,6-dimethylhept-3-yn-5-enoate, 2.6 g.

The subsequent procedure (hydrolysis, reaction with oxalyl chloride, etc.) was the same as that described in Example 1.

EXAMPLE 7

2-methylpent-2-en-4-yne was prepared as described in Example 1.

Ferric nitrate crystals (0.5 g.) were added to liquid ammonia (750 ml.) and after stirring for 5 minutes, sodium metal (7 g.) was added during 15 minutes and the mixture stirred for 1 hour. 2-methylpent-2-en-4-yne (25 g.) in dry diethyl ether (50 ml.) was added, the mixture stirred for 1.5 hours, and pyruvic acid (17.6 g.) in dry diethyl ether (50 ml.) was added dropwise during 30 minutes. The mixtures was stirred for 5 hours and the sodium salt slowly decomposed with ammonium chloride (26.5 g.). The ammonia was allowed to evaporate, the residue dissolved in water, acidified with concentrated hydrochloric acid and extracted with diethyl ether (4× 150 ml.). The ether extracts were combined, washed with water (25 ml.), dried with anhydrous magnesium sulphate and the ether evaporated. Distillation of the residue gave 2-hydroxy-2,6-dimethylhept-3-yn-5-enoic acid, 1.1 g.

The subsequent procedure (reaction with oxalyl chloride etc.) was the same as that described in Example 1.

We claim:

1. A trisubstituted 4-hydroxycyclopentan-1,3-dione having the formula

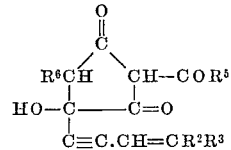

in which $R^5$ is selected from the group consisting of hydrogen atoms and alkyl groups having one to three carbon atoms, $R^3$ is an alkyl group having one to three carbons atoms, $R^5$ is an alkyl group having less than five carbon atoms and $R^6$ is selected from alkyl and alkenyl groups having less than seven carbon atoms.

2. The trisubstituted 4-hydroxycyclopentan-1,3-dione claimed in claim 1 in which $R^5$ is a 2-methylpropyl group, $R^2$ and $R^3$ are each methyl groups and $R^6$ is a 3-methyl-but-2-enyl group.

3. The trisubstituted 4-hydroxycyclopentan-1,3-dione claimed in claim 1 in which $R^5$ is a 1-methylethyl group, $R^2$ and $R^3$ are each methyl groups and $R^6$ is a 3-methyl-but-2-enyl group.

4. The trisubstituted 4-hydroxycyclopentan-1,3-dione claimed in claim 1 in which $R^5$ is a 1-methylpropyl group, $R^2$ and $R^3$ are each methyl groups and $R^6$ is a 3-methyl-but-2-enyl group.

5. The trisubstituted 4 - hydroxycyclopentan-1,3-dione claimed in claim 1 in which $R^5$ is a branched chain alkyl group having less than five carbon atoms.

References Cited

Stacy: J. Am. Chem. Soc., vol. 76, pp. 524 to 527 (1954).

LEON ZITVER, Primary Examiner

N. P. MORGENSTERN, Assistant Examiner

U.S. Cl. X.R.

99—140